Figure 1:
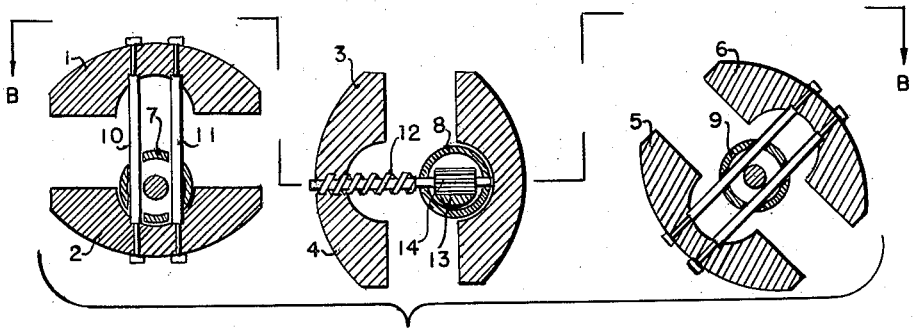

Feb. 20, 1951  R. K. BERNHARD  2,542,227
TESTING APPARATUS

Filed July 2, 1946  2 Sheets-Sheet 1

WITNESS:
JM Rodgers

INVENTOR:
Rudolf K. Bernhard

Feb. 20, 1951  R. K. BERNHARD  2,542,227
TESTING APPARATUS

Filed July 2, 1946  2 Sheets-Sheet 2

WITNESS:
Wm Rodgers

INVENTOR:
Rudolf K Bernhard

Patented Feb. 20, 1951

2,542,227

UNITED STATES PATENT OFFICE 2,542,227

TESTING APPARATUS

Rudolf K. Bernhard, Trenton, N. J.

Application July 2, 1946, Serial No. 681,101

10 Claims. (Cl. 74—61)

This invention relates generally to an apparatus hereinafter to be called an oscillator, for producing forces or moments for the purpose of testing the dynamic characteristics of specimens, instruments, structures, highways, soils, dams, and other materials.

There have been prior devices proposed serving these purposes, in which, however, the phase angle, action line, and direction of the pulsating forces and moments could not be altered independently from one another.

Furthermore, prior arrangements have been deficient in various respects, including the inability to change the direction of the excited sinusoidal forces continuously through an angle of 360° without changing the position of the machine, thus requiring an interruption of the test procedure.

Other deficiencies have been the inability to excite sinusoidal impulses with an action line not going through the center of gravity of the oscillator.

No prior machine based on the application of centrifugal forces allowed a change in the position of the action line of the excited impulses while the machine is operating.

Finally the deficiency that a change in eccentricity of the rotating weights is combined with a change in phase angle has been eliminated.

One object of my invention is to provide for the alteration of amplitude, frequency, phase angle, action line, and direction of the pulsating forces or moments manually at the will of the operator.

Another object of my invention is to provide improved apparatus and control systems, whereby all foregoing deficiencies may be substantially, if not wholly, overcome and at the same time obtaining a high degree of sensitivity and ease and rapidity of adjustment of the load, frequency, phase angle, action line and direction limits, as well as widely ranging load, frequency, phase angle, action line, and direction differentials between such limits.

A further object of my invention is to use the oscillator to excite a vibration table or vibrating platform to mechanical vibrations in any direction in one plane in order to calibrate instruments or to determine the sensitivity of instruments or any other items against mechanical vibrations. The change of center of gravity of the vibrating system by adding an instrument or another weight can be compensated for by changing the action line of the pulsating forces or moments without changing the position of the oscillator and thus requiring no interruption of test procedure.

Finally an object of my invention is the determination of the center of gravity of a vibrating system by changing the direction and eccentricity of the resultant forces or moments of the oscillator until the resultant motion of the vibrating system becomes a pure linear or a pure rotational motion, thus indicating that the excited pulsating forces or moments are passing through the center of gravity of the vibrating system.

Figure 2:
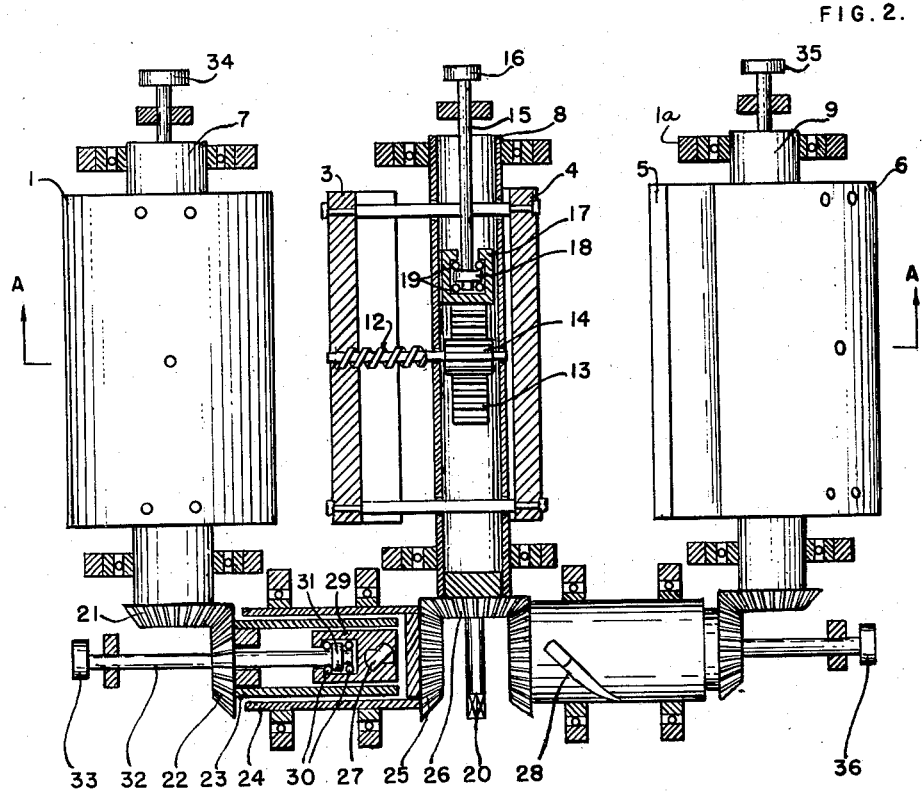

In the particular form of the invention, such as described herein merely for the purpose of illustrating one specific form among possible others that the invention might take in practice, I have shown in:

Figure 1 sectional elevations of the oscillator for producing pulsating loads along section A—A of Figure 2.

Figure 2 sectional plan views of the oscillator for producing pulsating loads along section B—B of Figure 1.

Figure 3A:
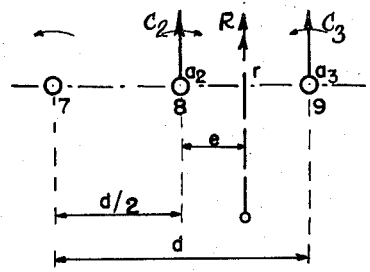
Figure 3B:
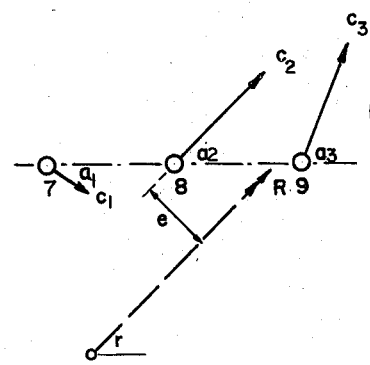
Figure 3C:
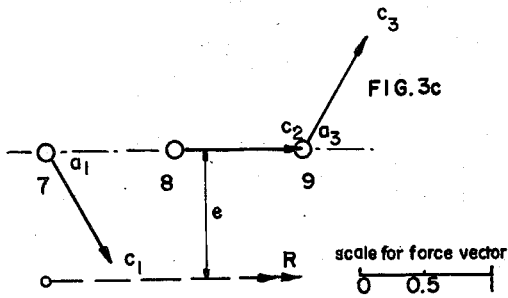

Figs. 3a, 3b and 3c diagrammatic sketches of the set-up for exciting maximum vibrations for change in direction of the resultant centrifugal force only, i. e. $a$ for vertical motion, $b$ for 45° motion, and $c$ for horizontal motion.

Figure 4A:
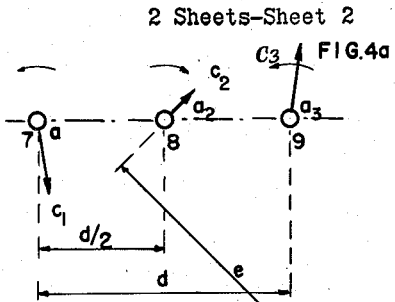
Figure 4B:
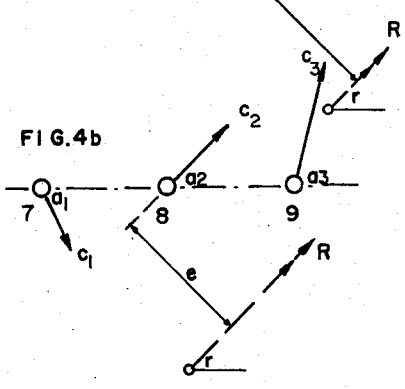
Figure 4C:
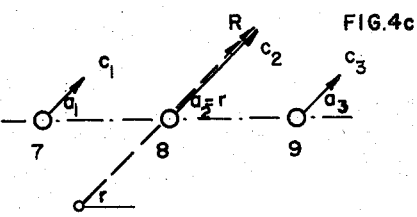

Figs. 4a, 4b and 4c diagrammatic sketches of the set-up for exciting maximum vibrations for change in eccentricity of the resultant centrifugal force only, i. e. for a 45° motion $a$ with large eccentricity, $b$ with medium eccentricity, and $c$ with zero eccentricity.

Figure 5:
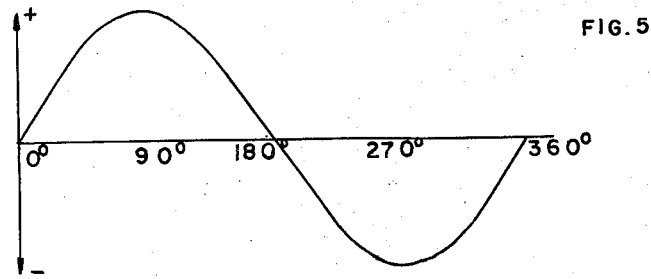

Figure 5 a diagrammatic sketch of impulses during one period.

I have shown in Figure 1 a sectional elevation of the oscillator. The three pairs of weights 1 and 2, 3 and 4, and 5 and 6 are rotatable around the geometrical axis of the tubular shafts 7, 8 and 9 respectively. Weight 1 is rigidly connected with weight 2 by the bolts 10 and 11 which can slide through the tubular shaft 7 in a transverse direction. Weights 3 and 4 and weights 5 and 6 are connected in the same manner with tubular shafts 8 and 9 respectively. The position of the weights 3 and 4 with respect to shaft 8 can be changed by rotating worm gear 12 by means of the rack and pinion drive 13, 14. The identical arrangement is provided for the weights 1, 2 and 5, 6. Hence a continuous change of eccentricity of the three pairs of weights with respect to their corresponding shafts allows a continuous control of the magnitude of the impulses from zero to maximum. The two pair of weights 1, 2 and 3, 4 are shown with a maximum deviation of their common center of gravity with respect to their rotating tubular shafts 7 and 8 respectively; the weights 1 and 2 are shown in a vertical position, the weights 3 and 4 in a horizontal position, and the weights 5 and 6 are shown with their common center of gravity coinciding with the geometrical axis of shaft 9 and in a 45° position with respect to the horizontal axis. In the position as shown, rotating the two pairs of weights 1 and 2, and 3 and 4 will excite maximum centrifugal forces and rotating the pair of weights 5 and 6 will excite no centrifugal forces.

All six weights can be made of interchangeable and various materials with various specific weights in order to increase the difference between maximum and zero impulses.

Figure 2 represents sectional views of the oscillator supported by a housing 1a. A change of eccentricity of the three pairs of weights 1, 2; 3, 4 and 5, 6 with respect to their corresponding tubular shafts 7, 8 and 9 can be achieved by sliding shaft 15 and knob 16. Shaft 15 and knob 16 do not rotate normally and allow a change of eccentricity of the weights 3 and 4 via the cylinder 17, the piston 18, and the ball bearings 19, while the machine is operating.

The pair of weights 3, 4 is driven by the tubular shaft 8 through the shaft coupling 20. Coupling 20 may be driven by an electric-, air-, or gas motor. The pair of weights 1 and 2 is connected with the pair of weights 3 and 4 via the tubular shaft 7, the two bevel gears 21 and 22, the two concentric tubular shafts 23 and 24, the two bevel gears 25 and 26, and tubular shaft 8. Hence the two tubular shafts 7 and 8 rotate with the same speed in opposite direction. The angular relationship between the two tubular shafts 23 and 24 can be changed by means of a differential key arrangement 27. Key 27 slides in longitudinal slots in shafts 23 and 24. Slot in shaft 23 is parallel to the axis of rotation of shaft 23, slot 28 forms a helix in the corresponding outer tubular shaft. Key 27 is rigidly attached to cylinder 29. Cylinder 29 can be moved horizontally via the ball bearings 30 and the piston 31 by means of shaft 32 and knob 33. Shaft 32 and knob 33 do not rotate normally. Hence a continuous control of the change in angular displacement between the two pairs of weights 1, 2 and 3, 4 is possible while the machine is operating. An identical phase shifting arrangement is interposed between the tubular shafts 8 and 9. Hence shaft 9 rotates with the same speed as shaft 8 in opposite direction and in the same direction as shaft 7.

Weights 1 and 2 are shown with a phase angle of 90° with respect to weights 3 and 4, and weights 5 and 6 with a phase angle of 45° with respect to weights 3 and 4.

Change in eccentricity and change in phase angle of all three pairs of weights are completely independent from another.

The direction magnitude, eccentricity and action line of the resultant vibratory motion can be controlled by hand.

Figures 3, 4 and 5 indicate diagrammatically the position of the three centrifugal force vectors $c_1$, $c_2$ and $c_3$, excited by the three pair of weights, their corresponding phase angles $a_1$, $a_2$ and $a_3$, the resultant force vector $R$, and its angle $r$ and its eccentricity $e$.

Figure 3 shows the set-up for exciting maximum vibrations for a change in direction of the resultant force vector only; Figure 3a indicates a vertical motion, Figure 3b indicates a 45° motion, and Figure 3c indicates a horizontal motion.

Figure 4 shows the set-up for exciting maximum vibrations in a 45° plane for a change in eccentricity only; Figure 4a indicates a large eccentricity; Figure 4b indicates a medium eccentricity, and Figure 4c indicates zero eccentricity.

Figure 5 shows the true sine curve of impulses excited during one complete revolution corresponding to the position of the weights in Figures 3 and 4.

In a similar way all possible types of vibrations in any direction or plane can be excited with a continuously variable frequency and amplitude range without changing the position of the oscillator hence without interruption of the test procedure.

It will, of course, be understood that various changes in details of construction and details of parts may be made by those skilled in the art without departing from the spirit of the invention as set forth in the appended claims.

In operation, the oscillator may be utilized in connection with any testing machine, vibration table, vibrating platform, instrument, structure, soil or dam. The oscillator is operated by eccentrically supported weights rotating at equal but variable speeds and hence, causing centrifugal forces of various sizes, directions and action lines in order to carry out tests with changing loads, frequencies, stresses, deflections or deformations.

The oscillator, according to the particular form as disclosed herein, comprises at least three or more rotating shafts; each shaft comprises two or more weights. Instead of two or more weights, one or more pairs of cylinders in an eccentric arrangement can be used. Shifting the weights or eccentrics in such position as to cause an eccentricity within the mass distribution of each pair of weights, any type of sinusoidal load impulses in every required direction and action line, hence, independent of the force of gravity, can be excited without changing the position of the oscillator. These load impulses do not occur as shocks, but according to the sine law.

While operating, the velocity with which these impulses follow depends on the angular speed with which the oscillator runs.

The magnitude and direction of the impulses depends on the relative position of the weights or eccentrics. In order to secure a pure sine curve of the impulses, all three pairs of weights or eccentrics rotate with the same speed and the two outer pairs of weights or eccentrics in opposite direction to the center pair of weights or eccentrics.

In order to maintain, while operating, the magnitude of the impulses, independent of the angular velocity of the rotating systems, it is necessary to alter the relative position of the weights or eccentrics. This is obtained by producing a displacement of the center of gravity of each pair of weights with respect to their axis of rotation and a phase displacement of the two outer pairs of weights or eccentrics with respect to the center pair of weights or eccentric. The displacements are obtained manually by adjustable rack and pinion drives or by differential key (arrangements). By these means the device produces sinusoidal impulses which can be kept constant throughout the test.

In operation, the device may therefore be used for carrying out fatigue or endurance tests until a rupture or destruction of the test specimen, instrument, or structure takes place. The limits within which the load in magnitude, direction and action line varies in a test can be fixed or altered while the machine is running.

I claim:

1. A device for producing harmonically pulsating forces of adjustable amplitude, frequency, phase angle, direction, and action line comprising in combination a housing, three parallel shafts rotatably supported in said housing, two weights rigidly connected with one another on each of said shafts, means interposed between each pair of weights on corresponding shafts for changing the relative position of each pair of weights with respect to the shaft, a connection between the central shaft and the left shaft and a connection between the central shaft and the right shaft for changing the angular relationship between the central pair of weights and the two side pairs of weights respectively, means of rotating said three shafts at the same speed and the center shaft in direction opposite to the direction of the two side shafts, controlling means for altering, while the machine is running, the relative angular position of each of the three pairs of weights with respect to the corresponding shafts, so as to keep the resultant centrifugal force of said weights constant at variable rotational speeds.

2. A device for producing harmonically pulsating forces of adjustable amplitude, frequency, phase angle, direction, and action line comprising in combination a housing, three parallel shafts rotatably supported in said housing, two weights rigidly connected with one another on each of said shafts, means interposed between each pair of weights on corresponding shafts for changing the relative position of each pair of weights with respect to the shaft, a connection between the central shaft and the left shaft and one interposed between the central shaft and the right shaft for changing the angular relationship between the central pair of weights and the two side pairs of weights respectively, means for rotating said three shafts at the same speed and the center shaft in direction opposite to the direction of the two side shafts, controlling means for altering, while the machine is running, the relative angular position of each of the three pairs of weights with respect to the corresponding shafts, so as to keep the resultant deformation of the objects to be tested constant at variable rotational speeds.

3. A device for producing harmonically pulsating forces of adjustable amplitude, frequency, phase angle, direction, and action line comprising in combination a housing, three parallel shafts rotatably supported in said housing, two weights rigidly connected with one another on each of said shafts, means interposed between each pair of weights on corresponding shafts for changing the relative position of each pair of weights with respect to the shaft, a connection between the central shaft and the left shaft and a connection between the central shaft and the right shaft for changing the angular relationship between the central pair of weights and the two side pairs of weights respectively, means of rotating said three shafts at the same speed and the center shaft in direction opposite to the direction of the two side shafts, controlling means for altering, while the machine is running, the relative angular position of each of the three pairs of weights with respect to the corresponding shafts, so as to rotate the action line of the resultant centrifugal force of said weights with a constant angular velocity at variable rotational speeds.

4. A device for producing harmonically pulsating forces of adjustable amplitude, frequency, phase angle, direction, and action line comprising in combination a housing, three parallel shafts rotably supported in said housing, two weights rigidly connected with one another on each of said shafts, means interposed between each pair of weights on corresponding shafts for changing the relative position of each pair of weights with respect to the shaft, a connection between the central shaft and the left shaft and a connection between the central shaft and the right shaft for changing the angular relationship between the central pair of weights and the two side pairs of weights respectively, means for rotating said three shafts at the same speed and the center shaft in direction opposite to the two side shafts, controlling means for altering, while the machine is running, the angular relationship between the center pair of weights and the left pair of weights and independently the angular relationship between the center pair of weights and the right pair of weights, so as to determine the center of gravity of a vibrating system.

5. A device for producing harmonically pulsating moments of adjustable amplitude, frequency, phase angle, direction, and action line comprising in combination a housing, three parallel shafts rotatably supported in said housing, two weights rigidly connected with one another, on each of said shafts, a rack and pinion drive interposed between each pair of weights on corresponding shafts for changing the relative position of each pair of weights with respect to the shaft, a connection between the central shaft and the left shaft and a connection between the central shaft and the right shaft for changing the angular relationship between the central pair of weights and the two side pairs of weights respectively, means of rotating said three shafts at the same speed and the center shaft in direction opposite to the direction of the two side shafts, controlling means for altering, while the machine is running, the relative angular position of each of the three pairs of weights with respect to the corresponding shafts, so as to keep the resultant centrifugal force of said weights constant at variable rotational speeds.

6. A device for producing harmonically pulsating moments of adjustable amplitude, frequency, phase angle, direction, and action line comprising in combination a housing, three parallel shafts rotatably supported in said housing, two weights rigidly connected with one another on each of said shafts, means interposed between each pair of weights on corresponding shafts for changing the relative position of each pair of weights with respect to the shaft, a differential key between the central shaft and the left shaft and a differential key between the central shaft and the right shaft for changing the angular relationship between the central pair of weights and the two side pairs of weights respectively, means of rotating said three shafts at the same speed and the center shaft in direction opposite to the direction of the two side shafts, controlling means for altering, while the machine is running, the relative angular position of each of the three pairs of weights with respect to the corresponding shafts, so as to keep the resultant deformation of the objects to be tested constant at variable speeds.

7. A device for producing harmonically pulsating moments of adjustable amplitude, frequency, phase angle, direction, and action line comprising in combination a housing, three parallel shafts rotatably supported in said housing, two weights rigidly connected with one another on each of said shafts, means interposed between each pair of weights on corresponding shafts for changing the relative position of each pair of weights with respect to the shaft, a connection between the central shaft and the left shaft and a connection between the central shaft and the right shaft, for changing the angular relationship between the central pair of weights and the two side pairs of weights respectively, means of rotating said three shafts at the same speed opposite to the direction of the the two side shafts, controlling means for altering, while the machine is running, the relative angular position of each of the three pairs of weights with respect to the corresponding shafts, so as to rotate the action line of the resultant centrifugal force of said weights with a constant angular velocity at variable rotational speeds.

8. A device for producing harmonically pulsating moments of adjustable amplitude, frequency, phase angle, direction, and action line comprising in combination a housing, three parallel shafts rotatably supported in said housing, two weights rigidly connected with one another on each of said shafts, means interposed between each pair of weights on corresponding shafts for changing the relative position of each pair of weights with respect to the shaft, a connection between the central shaft and the left shaft and a connection between the central shaft and the right shaft for changing the angular relationship between the central pair of weights and the two side pairs of weights respectively, means of rotating said three shafts at the same speed and the center shaft opposite to the direction of the two side shafts, controlling means, for altering while the machine is running, the angular relationship between the center pair of weights and the left pair of weights and independently the angular relationship between the center pair of weights and the right pair of weights, so as to determine the center of gravity of a vibrating system.

9. A device for producing pulsating forces of adjustable phase angle, direction, and action line, comprising in combination a housing, three parallel shafts rotatably supported in said housing, eccentric weights mounted on each of said shafts for rotation therewith, a connection between the central shaft and the left shaft and a connection between the central shaft and the right shaft for changing the relative angle between the eccentric weight on the central shaft and the eccentric weights on the side shafts respectively, and means for simultaneously rotating said three shafts.

10. A device for producing pulsating forces of adjustable phase angle, direction, and action line, comprising in combination a housing, three parallel shafts rotatably supported in said housing, eccentric weights mounted on each of said shafts for rotation therewith, a connection between the central shaft and the left shaft and a connection beween the central shaft and the right shaft for simultaneously rotating said shafts, means operable while said shafts are rotating for changing the relative angular adjustment between the eccentric weight on the central shaft and the eccentric weights on the side shafts respectively, and a power shaft operably connected with said connections between said shafts for imparting rotation to said shafts.

RUDOLPH K. BERNHARD.

REFERENCES CITED

The following references are of record in the file of this patent:

UNITED STATES PATENTS

| Number | Name | Date |
|---|---|---|
| 2,206,386 | Bernhard | July 2, 1940 |
| 2,410,170 | Lazan | Oct. 29, 1946 |